(12) United States Patent
Kiselev et al.

(10) Patent No.: US 7,069,381 B1
(45) Date of Patent: Jun. 27, 2006

(54) AUTOMATED RECOVERY FROM DATA CORRUPTION OF DATA VOLUMES IN RAID STORAGE

(75) Inventors: Oleg Kiselev, Palo Alto, CA (US); John A. Colgrove, Los Altos, CA (US)

(73) Assignee: VERITAS Operating Corporation, Mountain View, CA (US)

(*) Notice: Subject to any disclaimer, the term of this patent is extended or adjusted under 35 U.S.C. 154(b) by 333 days.

(21) Appl. No.: 10/609,487

(22) Filed: Jul. 1, 2003

(51) Int. Cl.
*G06F 11/08* (2006.01)
(52) U.S. Cl. .......................... 711/114; 714/6
(58) Field of Classification Search .................. 714/6, 714/753, 755, 758; 711/114
See application file for complete search history.

(56) References Cited

U.S. PATENT DOCUMENTS

| 5,463,643 A * | 10/1995 | Gaskins et al. ............. 714/766 |
| 6,687,791 B1 * | 2/2004 | Morrison ..................... 711/130 |
| 2003/0145270 A1 * | 7/2003 | Holt ........................... 714/766 |
| 2003/0167439 A1 * | 9/2003 | Talagala ..................... 714/770 |

* cited by examiner

*Primary Examiner*—Donald Sparks
*Assistant Examiner*—Jared Rutz
(74) *Attorney, Agent, or Firm*—Campbell Stephenson Ascolese LLP

(57) ABSTRACT

The present invention relates to an apparatus or computer executable method of detecting and repairing corrupt data in a RAID data storage system. In one embodiment, parity and checksum data are stored in the RAID data storage system for each stripe that stores data. The parity data is used to determine whether data in the corresponding stripe is corrupt. If stripe data is determined to be corrupt, the checksum data is used to correct the corruption.

16 Claims, 3 Drawing Sheets

AUTOMATED RECOVERY FROM DATA CORRUPTION OF DATA VOLUMES IN RAID STORAGE

BACKGROUND OF THE INVENTION

Redundant array of inexpensive (or independent) disks (RAID) is an evolving data storage technology that offers significant advantages in performance, capacity, reliability, and scalability to businesses that have demanding data storage and access requirements. In 1988, a paper was published by Patterson, Gibson, Katz, entitled "A Case for Redundant Arrays of Inexpensive Disks (RAID)," International Conference on Management of Data, pages 109–1116, June 1988. This paper laid the foundation for use of RAID data storage that would not only improve the data input/output (I/O) rate over that of a comparable single disk data storage system, but would also provide fault tolerance, i.e., the ability to reconstruct data stored on a failed disk.

RAID data storage systems are configured according to any one of a number of "RAID levels." The RAID levels specify how data is distributed across the disks in the array. In the paper noted above, the authors describe RAID level 1–RAID level 5. Since the publication of the paper mentioned above, additional RAID levels have been developed.

RAID data storage systems include an array of data storage disks. These data storage disks may take form in magnetic or optical data storage disks, or combinations thereof. RAID data storage systems may also include a RAID controller, although the term RAID data storage system should not be limited to a system that includes a RAID controller. The RAID controller is an electronic circuit or series of electronic circuits that provides an interface between a host computer and the array of disks. From the viewpoint of the host computer, the RAID controller makes the array of disks look like one virtual disk that is very fast, very large, and very reliable.

RAID levels are typically distinguished by the benefits included. These benefits include increased I/O performance and fault tolerance as noted above. Increased performance is achieved by simultaneous access to multiple disks which result in faster I/O and faster data access requests. Fault tolerance is typically achieved through a data recovery method in which data of a disk can be reconstructed in the event of failure of the disk. Fault tolerance allows the disk array to continue to operate with a failed disk.

Data recovery is accomplished, in many RAID levels, using parity data. The parity data is typically stored on a dedicated disk, or distributed over several disks within the array. When data on a disk is inaccessible due to, for example, hardware or software failure, the data sought can be reconstructed using the parity data. Reconstruction can occur as data is requested. Reconstruction can occur without a substantial degradation in system I/O performance. RAID controllers may reconstruct all data of a failed disk onto a spare disk, so that the data storage system can survive another disk failure.

RAID data storage systems employ data interleaving in which data is distributed over all of the data disks in the array. Data interleaving usually takes form in data "striping" in which data to be stored is broken down into components called "stripe units" which are then distributed across the array of disks. A stripe unit is typically defined as a bit, byte, block, or other unit of data. A "stripe" is a group of corresponding stripe units. Each disk in the array stores one stripe unit from each stripe. To illustrate, RAID level 5 uses data interleaving by striping data across all disks. RAID level 5 also distributes parity data across all disks.

Reconstruction of data in RAID data storage systems using parity data is a procedure well known in the art. Parity data for each stripe is typically calculated by logically combining data of all stripe units of the stripe. This combination is typically accomplished by an exclusive OR (XOR) of data of the stripe units. For a RAID level 5 data storage system having N disks, N−1 of the N disks will receive a stripe unit of the stripe, and the Nth disk will receive the parity data for the stripe. For each stripe, the disk receiving the parity data rotates such that all parity data is not contained on a single disk. I/O request rates for RAID level 5 are high because the distribution of parity data allows the system to perform multiple read and write functions at the same time.

As noted, should a disk fail on a RAID data storage system, the RAID controller can reconstruct data using corresponding parity data. Using a parity data reconstruction algorithm well known in the art, data of a stripe unit in the failed disk can be reconstructed as a function of the parity data and data of stripe units corresponding to the stripe unit of the failed disk.

Disk failure is one problem in RAID data storage systems. Another problem relates to data corruption. Data corruption has many sources. To illustrate, suppose the RAID controller of a data storage system receives new data $D_{new}$ from a computer system coupled thereto. This new data $D_{new}$ is to replace existing data $D_{old}$ of stripe unit $B_1$, of stripe S. Before the RAID controller overwrites the existing data $D_{old}$ of stripe unit $B_1$, the RAID controller must update exiting parity $P_{old}$ for stripe S. To this end, the RAID controller reads existing parity $P_{old}$ for stripe S and existing data $D_{old}$ of stripe unit $B_1$. Thereafter, the RAID controller generates new parity $P_{new}$ for stripe S as a function of existing parity $P_{old}$, the new data $D_{new}$, and existing data $D_{old}$. The RAID controller successfully overwrites existing parity $P_{old}$ for stripe S with the newly generated parity $P_{new}$.

Unfortunately, because of improper operation of hardware or software, existing data $D_{old}$ of stripe unit $B_1$ may not get overwritten with the new data $D_{new}$. For example, the new data $D_{new}$ may get inadvertently written to a disk track adjacent to the disk track that stores the existing data $D_{old}$ of the stripe unit (i.e., mis-tracking). When this happens, two tracks of the disk contain invalid or corrupted data. But the RAID controller believes the existing data $D_{old}$ of the stripe unit has been properly overwritten with the new data $D_{new}$. If the RAID controller receives a subsequent request from the computer system to read data of stripe unit $B_1$, $D_{old}$ will be returned rather than $D_{new}$. The computer system or application requesting the data may employ a data consistency checking algorithm and recognize that the returned data is not what is expected. If it is recognized that the data returned is invalid, the computer system may be able to send a second read request for the same data. This approach has a chance of recovering proper data contents in some mirrored (RAID-1) configurations, by causing the read to happen from an alternate mirror; and in some configurations where data is stored directly on raw disks additional attempts to read corrupted data may result in the disk's own error correction logic repairing data. Unfortunately, in the mis-tracking error situation described above, the RAID controller will once again return the corrupted contents of $D_{old}$ in response to the second request.

Another form of data corruption can occur if disk drive's firmware doesn't write the data to the disk platter, but reports successful completion of the write. In that case, the data stored in the disk block may be internally consistent, but "stale" and there for considered corrupted.

Yet another form of data corruption can occur if a faulty software or hardware component corrupts the data "in flight" by improperly copying or transmitting one or more bits of the data (bit-flipping).

SUMMARY OF THE INVENTION

The present invention relates to an apparatus or computer executable method of detecting and repairing corrupt data in a RAID data storage system. In one embodiment, parity and checksum data are stored in the RAID data storage system for each stripe that stores data. The parity data is used to determine whether data in the corresponding stripe is corrupt. If stripe data is determined to be corrupt, the checksum data is used to correct the corruption.

In one embodiment of the invention, the process of detecting corrupt data begins when a request to read data is received from a computer system in data communication with the RAID data storage system. The requested data is stored in a stripe unit of a stripe in the RAID data storage system. New parity data is generated as a function of the existing data stored in the stripe in response to receiving the request. This newly generated parity data is compared with existing parity data for the stripe. The existing and newly generated parity data are generated using the same algorithm. If the existing and newly generated parity data are not identical, data of the first stripe unit may be considered corrupt. The data of the first stripe unit will be returned to the computer system as valid if the existing and newly generated parity data compare equally. If the existing and newly generated parity data do not compare equally, then new data for a stripe unit is generated using the existing parity data and data of the stripe other than stripe unit. A new checksum is generated using the new data for the stripe unit, and the new checksum is compared to the existing checksum. If the newly checksum compares equally to the existing checksum, existing data of the stripe unit is considered corrupt and is overwritten with the newly generated stripe unit data. If the newly checksum does not compare equally to the existing checksum, another stripe unit of the stripe is checked in the same manner.

DRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The present invention provides an apparatus and method for recovering from corruption of data. The invention may take form in a computer readable medium that stores instructions executable by a computer system, wherein the computer system performs the method of recovering from data corruption in response to executing the instructions. The present invention will be described with reference to recovering from corruption in a data volume stored in a RAID data storage system, it being understood that the present invention should not be limited thereto.

Figures 1, 2, 3:
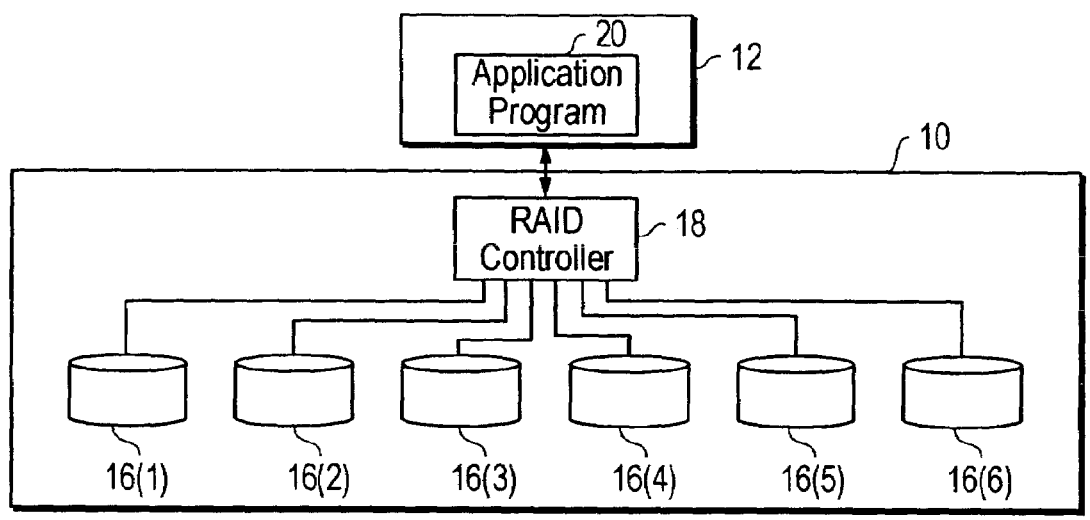
FIG. 1 is a block diagram of a RAID-5 data storage system employing one embodiment of the present invention.
FIG. 2 is a block diagram illustrating the distribution of volume data and error correction data in the data storage system of FIG. 1.
FIG. 3 is a block diagram illustrating another distribution of volume data and error correction data in the data storage system of FIG. 1.

FIG. 1 shows relevant components of an exemplary RAID data storage system 10. Data storage system 10 is coupled to computer system 12. The term coupled should not be limited to what is shown in FIG. 1. Two devices, e.g., data storage system 10 and computer system 12, may be coupled together via a third device (not shown).

Data storage system 10 includes data storage disks 16(1)–16(6), each of which is individually coupled to a RAID controller 18. The present invention can be implemented with a RAID data storage system that includes more or fewer disks than that shown in FIG. 1. RAID controller 18 may take form in a computer system having one or more processors that operate according to computer executable instructions stored in a computer readable medium. RAID controller 18 is capable of simultaneously reading data from one or more disks 16(1)–16(6).

Disks 16(1)–16(6) may take form in magnetic or optical data storage disks, or combinations thereof. Disks 16(1)–16(5) store one or more data volumes. For purposes of explanation, disks 16(1)–16(5) will be described as storing one data volume (data volume V), it being understood that the present invention should not be limited thereto. In addition to storing data volume V, disks 16(1)–16(5) store first error correction data. Disk drive 16(6) stores second error correction data as will be more fully described below. Data storage system 10 is configured to receive requests for data of volume V from computer system 12. Data storage system 10 may be coupled to receive requests for data from other computer systems (not shown).

FIGS. 2 and 3 illustrate, in block diagram form, the distribution of volume V data in storage system 10. FIGS. 2 and 3 also illustrate the distribution of the first and second error correction data. More particularly, FIGS. 2 and 3 show stripes $S_1$–$S_{max}$ distributed among disks 16(1)–16(5). Each stripe $S_y$ includes stripe units identified as $B_{y,1}$–$B_{y,4}$ and $SP_y$. The present invention will be described with stripe $S_y$ containing only four stripe units, it being understood that the present invention is applicable to stripes containing fewer or more than four stripe units. Each stripe unit $B_{y,1}$–$B_{y,4}$ includes a bit, byte, block, or other unit of data of volume V, while each stripe unit SPY stores first error correction data corresponding to data in strip units $B_{y,1}$–$B_{y,4}$.

The first error correction data may take any one of many different forms. Whatever form the first error correction takes, data of any stripe unit $B_{y,x}$ can be generated as a function of data in stripe units $B_{y,1}$–$B_{y,4}$, other than stripe unit $B_{y,x}$, and the first error correction data of stripe unit $SP_y$, when, for example, data of stripe unit $B_{y,x}$ is inaccessible due hardware or software failure. In one embodiment, each stripe unit $SP_y$ stores parity data calculated as a function of data in strip units $B_{y,1}$–$B_{y,4}$, it being understood that the first error correction data need not be limited thereto. Parity of each stripe unit SPY is typically calculated by logically combining data of stripe units $B_{y,1}$–$B_{y,4}$. This logical combination is typically accomplished by exclusively ORing (XORing) data of the stripe units $B_{y,1}$–$B_{y,4}$.

Each stripe $S_y$ has a corresponding entry of second error correction data stored in disk drive 16(6). The second error correction data may take any one of many different forms. In FIG. 2, each entry of second error correction data is stored in components $P_{y,1}$–$P_{y,4}$. Each component $P_{y,x}$ corresponds to a respective stripe unit $B_{x,y}$. In one embodiment, each component $P_{y,x}$ stores parity data calculated as a function of data in strip unit $B_{x,y}$. Parity data of each component $P_{y,x}$ is typically calculated by logically combining data of stripe unit $B_{x,y}$. This logical combination is typically accomplished by exclusively ORing (XORing) data of stripe unit $B_{x,y}$. It is noted that each component $P_{y,x}$ need not store parity data. However, each component $P_{y,x}$ stores first error correction data generated by applying a particular algorithm to data of stripe unit $B_{x,y}$.

Parity of a stripe unit $SP_y$ and component $P_{y,x}$ are updated each time data in a corresponding stripe unit is modified. To illustrate, RAID controller may receive a request from computer system 12 to overwrite existing data in stripe unit $B_{y,x}$ with new data. RAID controller 18, in response to receiving the request, reads existing data in stripe unit $B_{y,x}$ and existing parity of $SP_y$ and component $P_{y,x}$. Thereafter, the RAID controller 18 generates new parity for stripe unit $SP_y$ as a function of existing parity read from stripe unit $SP_y$, the new data received from computer system 12 and existing data read from stripe unit $B_{y,x}$. RAID controller 18 also generates new parity for component $P_{y,x}$ as a function of existing parity read from component $P_{y,x}$, the new data received from computer system 12 and existing data read from stripe unit $B_{y,x}$. The RAID controller overwrites (1) existing parity in stripe unit $SP_y$ with the newly generated parity for $SP_y$, (2) existing parity in component $P_{y,x}$ with the newly generated parity for $P_{y,x}$ and (3) existing data in stripe unit $B_{y,x}$ with new data received from computer system 12.

In FIG. 3, disk drive 16(6) second error correction is stored in entries $CS_1$–$CS_{max}$ corresponding to stripes $S_1$–$S_{max}$, respectively. In one embodiment, each entry $CS_y$ stores checksum data calculated as a function of data in stripe units $B_{y,1}$–$B_{y,4}$ and $SP_y$ of the corresponding stripe $S_y$. In an alternative embodiment, each entry $CS_y$ stores parity data calculated as a function of data in stripe units $B_{y,1}$–$B_{y,4}$ and $SP_y$, but using an parity generating algorithm different from the algorithm used to generate the parity data of corresponding stripe unit $SP_y$. Whatever form $CS_y$ entry data takes, data of any stripe unit $B_{y,x}$ can be generated as a function of $CS_y$ entry data and data of the stripe units of stripe $S_y$, other than stripe unit $B_{y,x}$.

Like parity of component $P_{y,x}$, checksum data of $CS_y$ is updated each time data of stripe unit $B_{y,x}$ is modified. When RAID controller 18 receives a request from computer system 12 to overwrite existing data in stripe unit $B_{y,x}$ with new data, RAID controller 18, reads existing data in stripe unit $B_{y,x}$, existing parity of SPY and checksum data of $CS_y$. Thereafter, the RAID controller 18 generates new parity for stripe unit $SP_y$ as a function of existing parity read from stripe unit $SP_y$, the new data received from computer system 12 and existing data read from stripe unit $B_{y,x}$. RAID controller 18 also generates a new checksum for $CS_y$ as a function of existing checksum of $CS_y$, the new data received from computer system 12 and existing data read from stripe unit $B_{y,x}$. The RAID controller overwrites (1) existing parity in stripe unit SPY with the newly generated parity for $SP_y$, (2) existing checksum data in $CS_y$ with the newly generated checksum, and (3) existing data in stripe unit $B_{y,x}$ with new data received from computer system 12.

Figure 4:
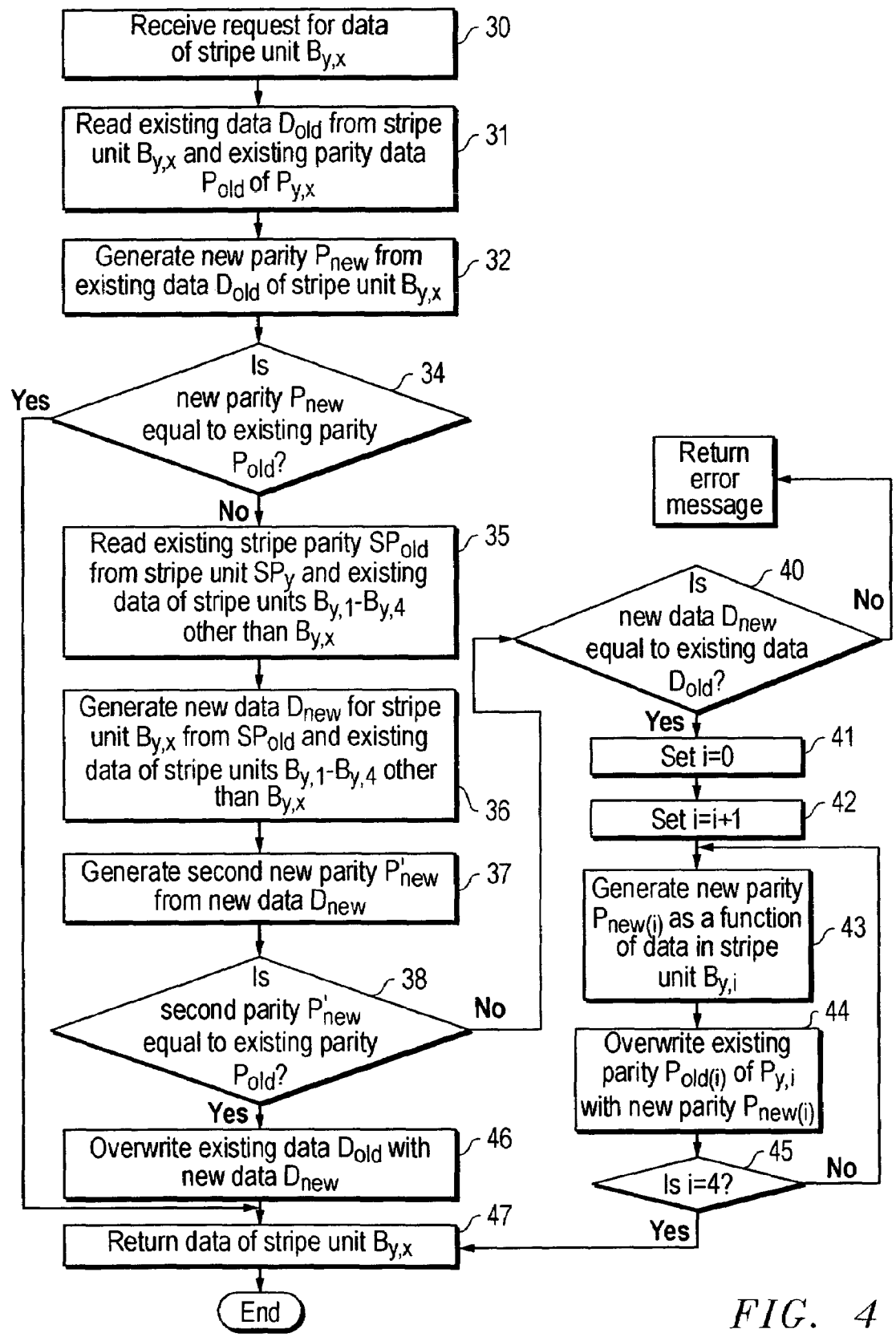
FIG. 4 is a flow chart illustrating operational aspects of detecting and correcting corrupt data.

Computer system 12 executes an application program that generates a request to read data from data volume V. The data sought is stored in one or more stripe units of disks 16(1)–16(5). However, the requested data in one of the stripe units may be corrupted. FIG. 4 illustrates aspects of RAID controller 18 operating in response to receiving the request from computer system 12. Using the process shown in FIG. 4, RAID controller 18 can detect and correct corrupted data. The process of FIG. 4 employs the data distribution and second error correction of FIG. 2.

RAID controller 18 receives a request for data stored in stripe unit $B_{y,x}$. In response to receiving the request in step 30, RAID controller reads existing data $D_{old}$ of stripe unit $B_{y,x}$ and existing parity $P_{old}$ of component $P_{y,x}$ as shown in step 31. Thereafter, in step 32, RAID controller 18 generates new parity $P_{new}$ as a function of the existingt data $D_{old}$. The algorithm used to generate new parity $P_{new}$ is the same algorithm used to generate existing parity data $P_{old}$ in $P_{y,x}$ of disk 16(6). In step 34, RAID controller 18 compares the newly generated parity $P_{new}$ with the existing parity $P_{old}$. If the newly generated parity $P_{new}$ does not compare equally to existing parity $P_{old}$, then it is presumed that either the data (i.e, existing data $D_{old}$ within stripe unit $B_{y,x}$) sought by the read request is corrupted, the existing parity $P_{old}$ of $P_{y,x}$ was generated invalidly, or other corruption problems exist. When newly generated parity $P_{new}$ compares equally to existing parity $P_{old}$, the process proceeds to step 47 where data of stripe unit $B_{y,x}$ is returned to computer system 12. If in step 34 RAID controller 18 determines inequality between $P_{new}$ and $P_{old}$, then the process proceeds to step 35 where RAID controller reads data of stripe units $B_{y,1}$–$B_{y,4}$, other than $B_{y,x}$, and parity data of stripe unit $SP_y$. Thereafter, RAID controller executes steps 36 and 37. In step step 36, RAID controller generates new data $D_{new}$. More particularly, RAID controller 18 generates new data $D_{new}$ as a function of data of stripe units $B_{y,1}$–$B_{y,4}$, other than $B_{y,x}$, and parity data of stripe unit SPY In step 37, RAID controller generates second new parity data $P'_{new}$ as a function of new data $D_{new}$. The algorithm used to generate second new parity data $P'_{new}$ is the same algorithm used to generate new parity $P_{new}$. In step 38, RAID controller 18 compares second new parity data $P'_{new}$ with new parity $P_{new}$. If second new parity data $P'_{new}$ compares equally with new parity $P_{new}$, then existing data $D_{old}$ in stripe unit $B_{x,y}$ is overwritten with the newly generated data $D_{new}$. However, if second new parity data $P'_{new}$ does not compare equally with new parity $P_{new}$ in step 38, the process proceeds to step 40 where RAID contoller 18 compares new data $D_{new}$ with the old data $D_{old}$. If $D_{new}$ does not compare equally with the old data $D_{old}$, then in one embodiment, an error message is returned to computer system 12 indicating that storage system 10 contains too much corruption.

If however $D_{new}$ compares equally with the old data $D_{old}$ in step 40, a presumption is made that one or more of second error correction components $P_{y,1}$–$P_{y,4}$ are corrupted or calculated improperly, and the process proceeds to steps 41–45. In steps 41 and 42, RAID controller 18 sets and increments a dummy variable i. In step 43, RAID controller generates new parity $P_{new(i)}$ as a function of existing data in stripe unit $B_{x,y}$. The algorithm used to generate new parity $P_{new(i)}$ is the same algorithm used to generate the existing parity $P_{old(i)}$ of $P_{y,x}$. Then, in step 44 RAID controller 18 overwrites existing parity $P_{old(i)}$ with new parity $P_{new(i)}$. In step 45, RAID controller 18 compares variable i to 4. If i is less than 4, the process reiterates beginning with step 42. When variable i equals 4 in step 45 or in response to overwriting existing data $D_{old}$ in step data 46, RAID controller returns data of stripe unit $B_{y,x}$ to computer system 12 as shown in step 47.

The process of FIG. 4 presumes that RAID controller 18 receives, in step 30, a request for data that is stored in only one stripe unit $B_{y,x}$. If, however, RAID controller 18 receives a request for data stored in more than one stripe unit, the process shown in FIG. 4 is repeated for each of the stripe units that stores requested data. The process illustrated in FIG. 4 may increase the time it takes to return data to computer system 12 when compared to the prior art. However, employing the process of FIG. 4 enhances the probability that data returned to computer system 12 is valid.

Figure 5:
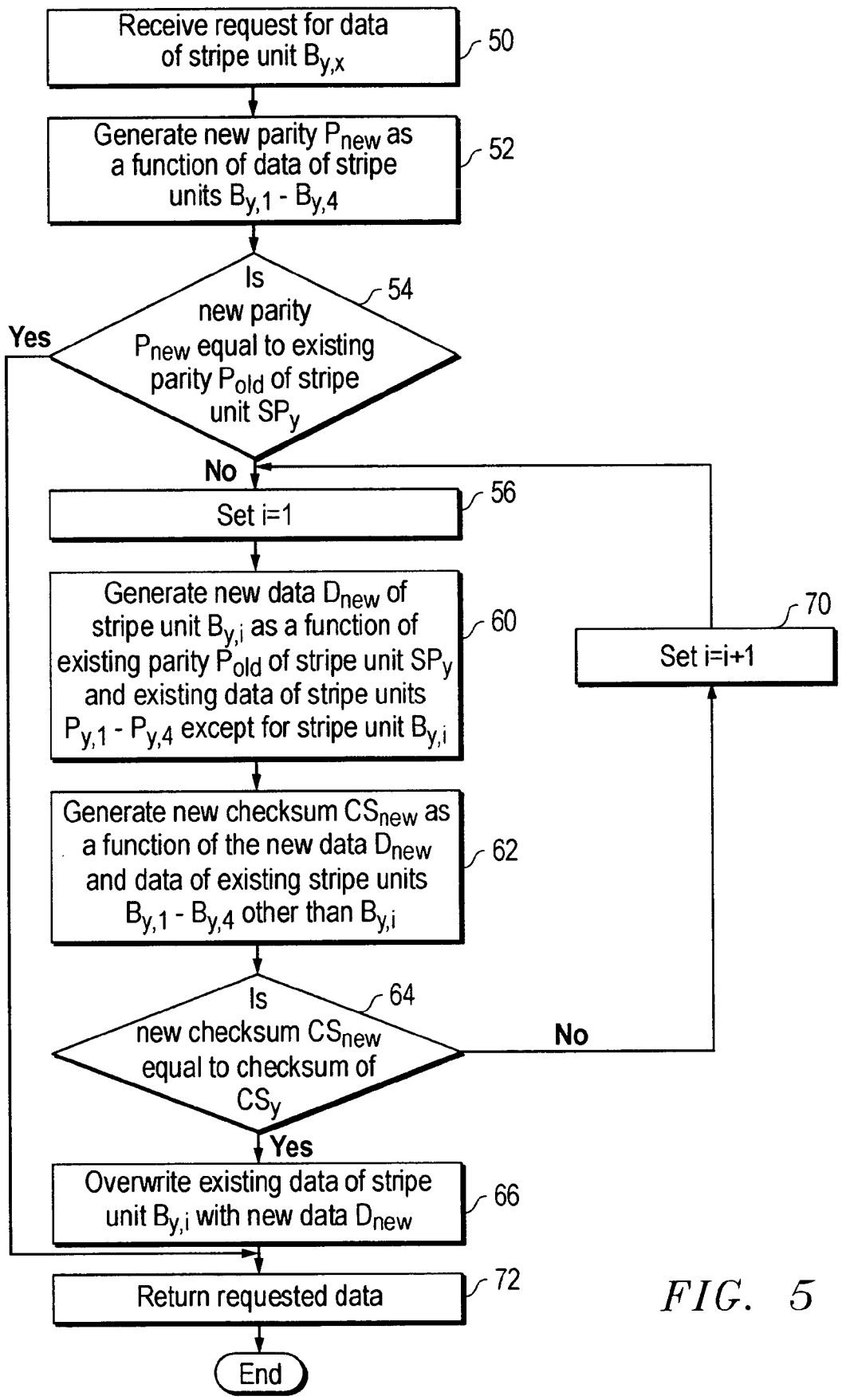
FIG. 5 is another flow chart illustrating operational aspects of detecting and correcting corrupt data.

FIG. 4 illustrates one embodiment of a process for detecting and correcting corrupted data in data storage system 10. FIG. 5 is a flow chart illustrating an alternative process performed by RAID controller 18 for detecting and correcting corrupted data in data storage system 10. The process of FIG. 5 employs the data distribution and second error correction of FIG. 3.

In step 50, RAID controller 18 receives a request for data from computer system 12. The requested data is stored in stripe unit $B_{y,x}$. In response to receiving the request in step 50, RAID controller 18 generates new parity $P_{new}$ as a function of data of stripe units $B_{y,1}$–$B_{y,4}$. It is noted that new parity $P_{new}$ is generated using the same algorithm used to generate existing parity $P_{old}$ of stripe unit $SP_y$. RAID controller 18 then compares the newly generated parity $P_{new}$ with existing parity $P_{old}$ of stripe unit SPY. In step 54, if the new parity $P_{new}$ equals the existing parity $P_{old}$, then the data of stripe unit $B_{y,x}$ is considered valid and is subsequently returned to computer system 12 as shown in step 72. However, if parity $P_{new}$ does not compare equally to existing parity $P_{old}$, then it is presumed that corrupted data exists in one of the stripe units $B_{y,1}$–$B_{y,4}$. Steps 56–70 illustrate operational aspects of identifying and correcting the corrupted data. More particularly, in step 56, RAID controller sets a dummy variable i=1. Thereafter, in step 60, RAID controller 18 generates new data $D_{new}$ of stripe unit $B_{y,i}$ as a function of existing parity $P_{old}$ of stripe unit $SP_y$ and existing data of stripe units $P_{y,1}$–$P_{y,4}$, other than stripe unit $B_{y,i}$. In the first iteration of steps 56–70, i=1 and RAID controller 18 generates new data $D_{new}$ of stripe unit $B_{y,1}$, as a function of existing parity $P_{old}$ of stripe unit SPY and existing data of stripe units $P_{y,2}$–$P_{y,4}$.

RAID controller 18 then generates a new checksum $CS_{new}$ as a function of the new data $D_{new}$ and data of existing stripe units $B_{y,1}$–$B_{y,4}$, other than $B_{y,i}$ as shown in step 62. It is noted that the algorithm for generating the new checksum $C_{Snew}$ is the same algorithm used to generate the checksums stored within entries $CS_1$–$CS_{max}$ of disk 16(6). RAID controller 18 accesses the existing checksum stored within $CS_y$, and in step 64 compares the existing checksum with the new checksum $CS_{new}$. If the newly generated checksum $CS_{new}$ does not equate to the existing checksum within $CS_y$, in step 64, the data within $B_{y,i}$ is considered valid, and the process repeats. In other words, steps of 56–66 are repeated after dummy variable i is incremented by 1 in step 70.

Steps 56–66 are repeated until in step 64, the new checksum $CS_{new}$ equates to the existing checksum stored in $CS_y$. When $CS_{new}$ equates to the existing checksum stored in $CS_y$, the old data $D_{old}$ stored within stripe unit $B_{y,i}$ is considered corrupt, and in step 66, RAID controller 18 overwrites existing data $D_{old}$ of stripe unit $B_{y,i}$ with the newly generated data $D_{new}$. Thereafter the process ends after the newly generated data $D_{new}$ written to stripe unit $B_{y,i}$, is returned to computer system 12 as shown in 72.

It is noted that the process in FIG. 5 presumes that the request received in step 50 is for data contained in only one stripe unit $B_{y,x}$. If RAID controller 18 receives requests for data stored in more than one stripe unit, the process shown in FIG. 5 can repeat for each of the stripe units that stores requested data.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

We claim:

1. In a RAID data storage system comprising a stripe, wherein the stripe comprises stripe units $B_1$–$B_{max}$, a method comprising:
   receiving a request to read data from stripe unit $B_x$, wherein $B_x$ is one of stripe units $B_1$–$B_{max}$, wherein the request is received from a computer system in data communication with the RAID data storage system;
   reading stripe parity P corresponding to stripe units $B_1$–$B_{max}$ in response to receiving the request;
   generating new stripe parity $P_{new}$ corresponding to stripe units $B_1$–$B_{max}$ as a function of data of each of the stripe units $B_1$–$B_{max}$;
   comparing the new stripe parity $P_{new}$ with the stripe parity P;
   returning stripe unit $B_x$ data to the computer system if the stripe parity P compares equally to the new stripe parity $P_{new}$.

2. The method of claim 1 wherein the RAID data storage system comprises a parity RAID data storage system.

3. The method of claim 2 wherein the parity RAID data storage system comprises a RAID-5 data storage system.

4. In a RAID data storage system comprising a stripe, wherein the stripe comprises stripe units $B_1$–$B_{max}$, a method comprising:
   receiving a request to read data from stripe unit $B_x$, wherein $B_x$ is one of stripe units $B_1$–$B_{max}$, wherein the request is received from a computer system in data communication with the RAID data storage system;
   reading stripe parity P corresponding to stripe units $B_1$–$B_{max}$n response to receiving the request;
   generating new stripe parity $P_{new}$ corresponding to stripe units $B_1$–$B_{max}$ as a function of data of each of the stripe units $B_1$–$B_{max}$;
   comparing the new stripe parity $P_{new}$ with the stripe parity P;
   if stripe parity P does not compare equally to new stripe parity $P_{new}$:
   reading checksum CS data from memory, wherein the checksum CS data corresponds to stripe units $B_1$–$B_{max}$;
   (a) generating new data for stripe unit $B_y$, one of the stripe units $B_1$–$B_{max}$ as a function of checksum CS data and data of stripe units $B_1$–$B_{max}$ other than stripe unit $B_y$;
   (b) generating new checksum $CS_{new}$ data as a function of the new data for stripe unit $B_y$ and data of stripe units $B_1$–$B_{max}$ other than stripe unit $B_y$;
   (c) comparing new checksum $CS_{new}$ data with checksum CS data;

(d) overwriting data of stripe unit $B_y$ with the new data of stripe unit $B_y$ if new checksum $CS_{new}$ data compares equally to checksum CS data.

5. The method of claim 4 further comprising changing the value of variable y and repeating (a)–(d) if new checksum $CS_{new}$ data does not compare equally with checksum CS data.

6. The method of claim 4 wherein the RAID data storage system comprises a parity RAID data storage system.

7. The method of claim 6 wherein the parity RAID data storage system comprises a RAID-5 data storage system.

8. The method of claim 4 further comprising returning stripe unit $B_x$ data to the computer system if the stripe parity P compares equally to the new stripe parity $P_{new}$.

9. A computer readable medium storing instructions executable by a first computer system in a RAID data storage system, wherein the RAID data storage system comprises a stripe, wherein the stripe comprises stripe units $B_1$–$B_{max}$, wherein the first computer system performs a method in response to executing instructions stored on the computer readable medium, the method comprising:

reading stripe parity P corresponding to stripe units $B_1$–$B_{max}$ in response to receiving a request to read data from stripe unit $B_x$, wherein $B_x$ is one of $B_1$–$B_{max}$, wherein the request is received from a second computer system in data communication with the first computer system;

generating new stripe priority $P_{new}$ corresponding to stripe units $B_1$–$B_{max}$ as a function of data of each of the stripe units $B_1$–$B_{max}$;

comparing the new stripe parity $P_{new}$ with the stripe parity P;

returning stripe unit $B_x$ data to the second computer system if the stripe parity P compares equally to the new stripe parity $P_{new}$.

10. The computer readable medium of claim 9 wherein the RAID data storage system comprises a parity RAID data storage system.

11. The computer readable medium of claim 10 wherein the parity RAID data storage system comprises a RAID-5 data storage system.

12. A computer readable medium storing instructions executable by a first computer system in a RAID data storage system, wherein the RAID data storage system comprises a stripe, wherein the stripe comprises stripe units $B_1$–$B_{max}$, wherein the first computer system performs a method in response to executing instructions stored on the computer readable medium, the method comprising:

reading stripe parity P corresponding to stripe units $B_1$–$B_{max}$ in response to receiving a request to read data from stripe unit $B_x$, wherein $B_x$ is one of $B_1$–$B_{max}$, wherein the request is received from a second computer system in data communication with the first computer system;

generating new stripe priority $P_{new}$ corresponding to stripe units $B_1$–$B_{max}$ as a function of data of each of the stripe units $B_1$–$B_{max}$;

comparing the new stripe parity $P_{new}$ with the stripe parity P;

if stripe parity P does not compare equally to new stripe parity $P_{new}$:

reading checksum CS data corresponding to stripe units $B_1$–$B_{max}$;

(a) generating new data for $B_y$, one of the stripe units $B_1$–$B_{max}$, as a function of checksum CS data and data of stripe units $B_1$-$B_{max}$ other than stripe unit $B_y$;

(b) generating new checksum $CS_{new}$ data as a function of the new data for stripe unit $B_y$ and data of stripe units $B_1$–$B_{max}$ other than stripe unit $B_y$;

(c) comparing new checksum $CS_{new}$ data with checksum CS data;

(d) overwriting data of stripe unit $B_y$ with the new data of stripe unit $B_y$ if new checksum $CS_{new}$ data compares equally to checksum CS data.

13. The computer readable medium of claim 12 wherein the method further comprises changing the value of y and repeating (a)–(d) if new checksum $CS_{new}$ data does not compare equally with checksum CS data.

14. The computer readable medium of claim 12 wherein the RAID data storage system comprises a parity RAID data storage system.

15. The computer readable medium of claim 14 wherein the parity RAID data storage system comprises a RAID-5 data storage system.

16. The computer readable medium of claim 12 wherein the method further comprises returning stripe unit $B_x$ data to the second computer system if the stripe parity P compares equally to the new stripe parity $P_{new}$.

* * * * *